US008948233B2

(12) United States Patent
Miyoshi et al.

(10) Patent No.: US 8,948,233 B2
(45) Date of Patent: Feb. 3, 2015

(54) WIRELESS RELAYING DEVICE, WIRELESS TRANSMISSION DEVICE, AND WIRELESS RELAYING METHOD

(75) Inventors: Kenichi Miyoshi, Kanagawa (JP); Megumi Ichikawa, legal representative, Kanagawa (JP); Seigo Nakao, Kanagawa (JP); Daichi Imamura, Kanagawa (JP); Takashi Enoki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 157 days.

(21) Appl. No.: 13/515,130

(22) PCT Filed: Dec. 15, 2010

(86) PCT No.: PCT/JP2010/007281
§ 371 (c)(1),
(2), (4) Date: Jun. 11, 2012

(87) PCT Pub. No.: WO2011/074257
PCT Pub. Date: Jun. 23, 2011

(65) Prior Publication Data
US 2013/0100988 A1    Apr. 25, 2013

(30) Foreign Application Priority Data
Dec. 15, 2009    (JP) .................. 2009-284345

(51) Int. Cl.
*H04B 7/17* (2006.01)
*H04B 7/15* (2006.01)
(Continued)

(52) U.S. Cl.
CPC .................. *H04B 7/15* (2013.01); *H04B 7/155* (2013.01); *H04L 25/24* (2013.01); *H04B 7/15528* (2013.01); *H04B 7/15507* (2013.01)
USPC ....................................................... 375/211

(58) Field of Classification Search
CPC ...... H04B 7/15; H04B 7/155; H04B 7/15528; H04B 7/15507; H04B 3/36; H04B 7/15542; H04L 25/24; H04L 25/20; H04L 12/44; H04L 12/46
USPC ......................................................... 375/211
See application file for complete search history.

(56) References Cited

U.S. PATENT DOCUMENTS 3,643,026 A  *  2/1972  Teurnier ....................... 178/70 R
6,046,629 A  *  4/2000  Akiyama et al. ............. 329/304
(Continued)

FOREIGN PATENT DOCUMENTS

JP    WO 2009/031320    *    3/2009
JP    2009-159457         7/2009
(Continued)

OTHER PUBLICATIONS
International Search Report dated Mar. 22, 2011.

*Primary Examiner* — Zewdu Kassa
(74) *Attorney, Agent, or Firm* — Dickinson Wright PLLC

(57) ABSTRACT

Provided is a wireless relaying device, wherein system capacity can be increased by reducing power consumption required for relay processing at mobile stations equipped with relaying function. This is a relaying node (200) that relays communication between an originating node and a destination node, and that is provided with: a demodulation unit (203) that demodulates a signal transmitted from the originating node; a decoding unit (205) that obtains a signal destined for the relaying node (200), by decoding an amplitude bit from among a plurality of bits that comprise each of the symbols of the signal demodulated by the demodulation unit (203); and a modulation unit (208) that generates a relay signal destined for the destination node, by modulating a phase bit from among the plurality of bits that comprise each of the symbols of the signal demodulated by the demodulation unit (203).

7 Claims, 17 Drawing Sheets

(51) Int. Cl.
*H04B 7/155* (2006.01)
*H04L 25/24* (2006.01)

(56) References Cited

U.S. PATENT DOCUMENTS

| | | | | |
|---|---|---|---|---|
| 6,160,855 | A * | 12/2000 | Nakamura et al. | 375/280 |
| 6,829,311 | B1 * | 12/2004 | Riley | 375/326 |
| 6,937,668 | B2 * | 8/2005 | Sridharan et al. | 375/296 |
| 7,512,188 | B1 * | 3/2009 | Watson et al. | 375/279 |
| 8,005,160 | B2 * | 8/2011 | Steer et al. | 375/267 |
| 8,452,229 | B2 * | 5/2013 | Horiuchi et al. | 455/7 |
| 8,542,624 | B2 * | 9/2013 | Chae et al. | 370/315 |
| 2003/0198478 | A1 * | 10/2003 | Vrazel et al. | 398/183 |
| 2007/0076820 | A1 * | 4/2007 | Kao et al. | 375/322 |
| 2007/0087770 | A1 * | 4/2007 | Gan | 455/522 |
| 2008/0025323 | A1 * | 1/2008 | Khan | 370/400 |
| 2008/0159430 | A1 * | 7/2008 | Steer et al. | 375/267 |
| 2008/0192861 | A1 * | 8/2008 | Lewis | 375/300 |
| 2008/0247372 | A1 * | 10/2008 | Chion et al. | 370/338 |
| 2008/0305740 | A1 * | 12/2008 | Horiuchi et al. | 455/11.1 |
| 2009/0036051 | A1 | 2/2009 | Horiuchi | |
| 2009/0175214 | A1 * | 7/2009 | Sfar et al. | 370/315 |
| 2009/0213778 | A1 * | 8/2009 | Tao et al. | 370/315 |
| 2009/0291658 | A1 * | 11/2009 | Castle | 455/255 |
| 2010/0008288 | A1 * | 1/2010 | Taori et al. | 370/315 |
| 2010/0156540 | A1 * | 6/2010 | De Graauw et al. | 330/295 |
| 2010/0246708 | A1 | 9/2010 | Horiuchi | |
| 2010/0248613 | A1 * | 9/2010 | Miyoshi et al. | 455/7 |
| 2011/0069655 | A1 * | 3/2011 | Ikeda | 370/315 |
| 2012/0127922 | A1 * | 5/2012 | Feher | 370/320 |
| 2012/0201331 | A1 * | 8/2012 | Lim | 375/308 |
| 2013/0094432 | A1 * | 4/2013 | Cai | 370/315 |
| 2013/0294543 | A1 * | 11/2013 | Shute et al. | 375/296 |

FOREIGN PATENT DOCUMENTS

| | | |
|---|---|---|
| WO | 2007/102344 | 9/2007 |
| WO | 2009/066451 | 5/2009 |

* cited by examiner

| AMPLITUDE BIT | PHASE BIT | |
|---|---|---|
| r | d | d |
FIG.5A
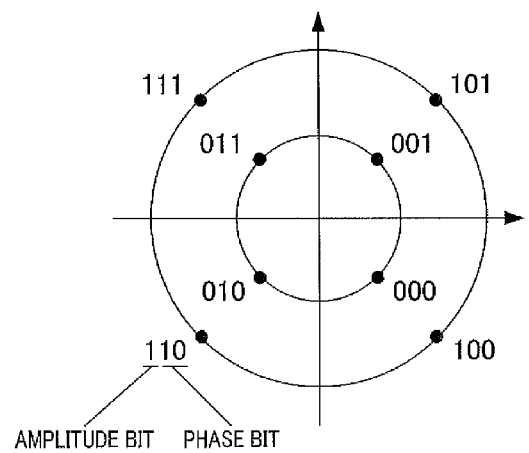
FIG.5B
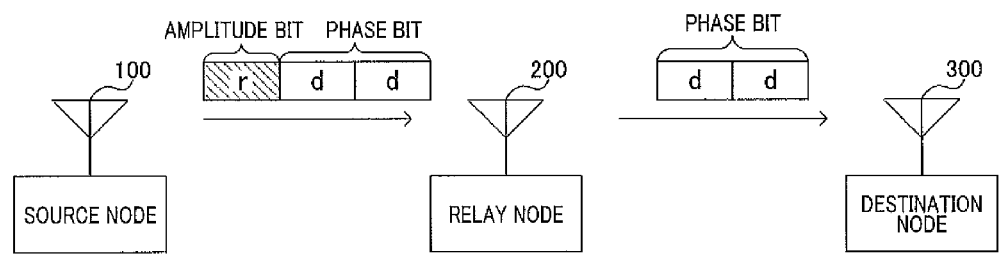
FIG.5C

| AMPLITUDE BIT | PHASE BIT | |
|---|---|---|
| | b | d |
| DIRECTED TO RELAY NODE | BROADCAST DATA | DIRECTED TO DESTINATION NODE |

FIG.7

| AMPLITUDE BIT (ON/OF SETTING INFORMATION) | PHASE BIT (DATA) | |
|---|---|---|
| b0 | b1 | b2 |
| 0 | 0 | 1 |
| 0 | 1 | 1 |
| 0 | 1 | 0 |
| 0 | 0 | 0 |
| 1 | 0 | 1 |
| 1 | 1 | 1 |
| 1 | 1 | 0 |
| 1 | 0 | 0 |

Rows 1-4: DATA DIRECTED TO RELAY NODE
Rows 5-8: DATA DIRECTED TO DESTINATION NODE

FIG.13

| NUMBER OF AMPLITUDE BITS | NUMBER OF PHASE BITS | SYMBOL |
|---|---|---|
| 1 | 2 | 8PASK |
| 1 | 3 | 16PASK |
| 2 | 2 | 16QAM |
| ⋮ | ⋮ | ⋮ |
| k | l | $2^{(k+l)}$QAM |

DATA DIRECTED TO RELAY NODE (columns: amplitude bits)
DATA DIRECTED TO DESTINATION NODE (column: phase bits)

WIRELESS RELAYING DEVICE, WIRELESS TRANSMISSION DEVICE, AND WIRELESS RELAYING METHOD

TECHNICAL FIELD

The present invention relates to a radio relay apparatus, a radio transmitting apparatus and a radio relay method.

BACKGROUND ART

In recent years, studies are being carried out on a mobile communication system in which a radio communication mobile station apparatus (hereinafter simply referred to as "mobile station") has a relay function (repeater function) that relays a signal directed to another mobile station (e.g., see Patent Literature 1).

In this mobile communication system, for example, the mobile station having the relay function relays a signal directed to the other mobile station transmitted from a radio communication base station apparatus (hereinafter simply referred to as "base station"). This allows even a mobile station that has difficulty in directly communicating with the base station to communicate with the base station via the mobile station having the relay function, and thereby increases system capacity.

CITATION LIST

Patent Literature

PLT 1
Japanese Patent Application Laid-Open No. 2009-159457

SUMMARY OF INVENTION

Technical Problem

However, in the above mobile communication system, the mobile station having the relay function needs to consume power of the mobile station itself to relay a signal directed to the other mobile station. To be more specific, when relaying a signal directed to the other mobile station, the mobile station having the relay function consumes power for operating a reception RF circuit and demodulation circuit in a receiving circuit and consumes power for operating a modulation circuit and transmission RF circuit in a transmitting circuit.

Such power consumption involved in relay processing causes the charge capacity of a battery provided for the mobile station having the relay function to decrease. Therefore, the more relay processing the mobile station having the relay function performs on a signal directed to the other mobile station, the less the charge capacity of the battery becomes, resulting in a problem that the mobile station having the relay function itself can no longer transmit/receive signals.

On the other hand, when a certain mobile station does not perform relay processing for other mobile stations, there may be mobile stations that cannot perform communication at all, with the result that it is not possible to increase the system capacity of the mobile communication system.

It is an object of the present invention to provide a radio relay apparatus, a radio transmitting apparatus and a radio relay method that reduce power consumption required for relay processing in a mobile station having a relay function, and can thereby increase system capacity.

Solution to Problem

A radio relay apparatus according to the present invention is a radio relay apparatus that relays communication between a radio transmitting apparatus and a radio receiving apparatus, and adopts a configuration including: a demodulation section that demodulates a signal transmitted from the radio transmitting apparatus; a decoding section that decodes an amplitude bit among a plurality of bits constituting each symbol of the demodulated signal and obtains a signal directed to the radio relay apparatus, and a modulation section that modulates a phase bit among the plurality of bits constituting each symbol of the demodulated signal and generates a relay signal directed to the radio receiving apparatus.

A radio transmitting apparatus according to the present invention is a radio transmitting apparatus that transmits a signal to a radio relay apparatus that relays communication between the radio transmitting apparatus and a radio receiving apparatus, and the radio receiving apparatus, and adopts a configuration including: an allocation section that allocates data directed to the radio relay apparatus at a bit position corresponding to an amplitude bit among a plurality of bits constituting each symbol of the signal and allocates data directed to the radio receiving apparatus at a bit position corresponding to a phase bit among the plurality of bits constituting each symbol of the signal; and a modulation section that modulates the signal including the amplitude bit and the phase bit.

A radio relay method according to the present invention is a radio relay method in a radio relay apparatus that relays communication between a radio transmitting apparatus and a radio receiving apparatus, including: a demodulating step of demodulating a signal transmitted from the radio transmitting apparatus; a decoding step of decoding an amplitude bit among a plurality of bits constituting each symbol of the demodulated signal and obtaining a signal directed to the radio relay apparatus; and a modulating step of modulating a phase bit among the plurality of bits constituting each symbol of the demodulated signal and generating a relay signal directed to the radio receiving apparatus.

Advantageous Effects of Invention

According to the present invention, it is possible to reduce power consumption required for relay processing in a mobile station having a relay function and thereby increase a system capacity.

BRIEF DESCRIPTION OF DRAWINGS

FIG. 5A is a diagram illustrating bits constituting each symbol of a signal transmitted from the source node according to Embodiment 1 of the present invention;

FIG. 5B is a diagram illustrating a constellation of the signal transmitted from the source node according to Embodiment 1 of the present invention;

FIG. 5C is a diagram illustrating relay processing in the communication system according to Embodiment 1 of the present invention;

FIG. 7 is a diagram illustrating bits constituting each symbol of a signal transmitted from a source node according to Embodiment 2 of the present invention;

FIG. 13 is a diagram illustrating bits constituting each symbol of a signal transmitted from the source node according to Embodiment 4 of the present invention;

DESCRIPTION OF EMBODIMENTS

Hereinafter, embodiments of the present invention will be described in detail with reference to the accompanying drawings.

Figure 1:
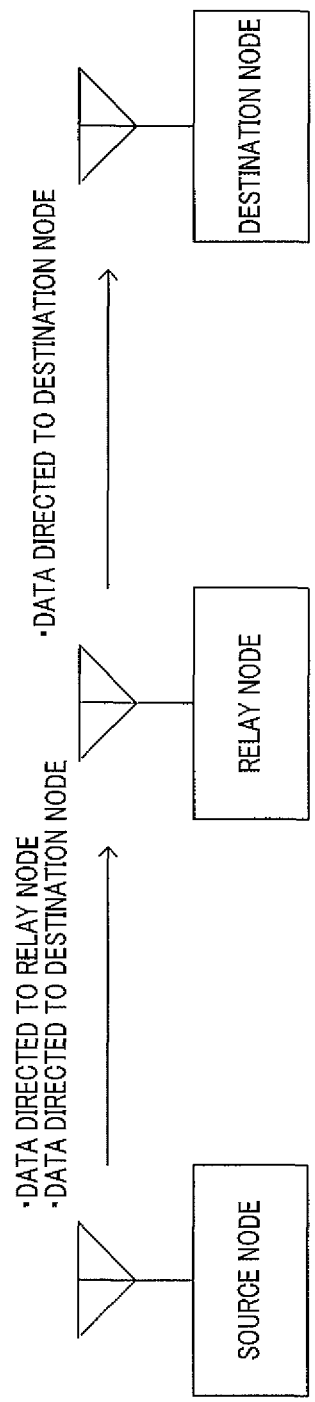
FIG. 1 is a diagram illustrating a communication system according to each embodiment of the present invention.

As shown in FIG. 1, the following description will describe a communication system including a radio transmitting apparatus (hereinafter, referred to as "source node" such as the aforementioned base station), a radio relay apparatus (hereinafter, referred to as "relay node" such as the aforementioned mobile station having a relay function), and a radio receiving apparatus (hereinafter, referred to as "destination node" such as the aforementioned other mobile station).

In this communication system, the source node transmits data directed to the relay node and data directed to the destination node as shown in FIG. 1. On the other hand, the relay node receives the signal transmitted from the source node and relays the data directed to the destination node out of the received signal to the destination node.

Embodiment 1

Figure 2:
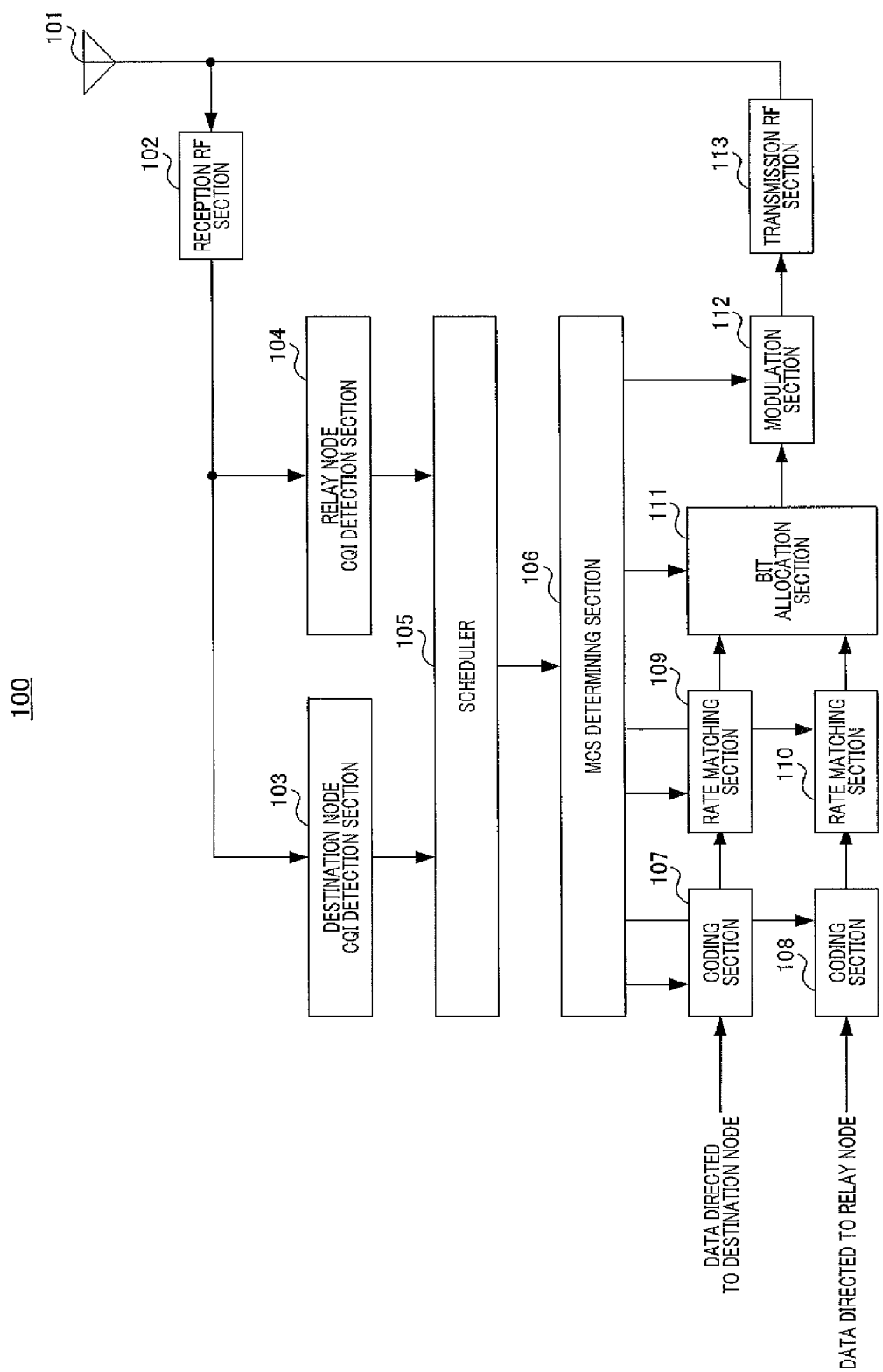
FIG. 2 is a block diagram illustrating a configuration of a source node according to Embodiment 1 of the present invention.

FIG. 2 shows a configuration of source node 100 according to the present embodiment.

In source node 100 shown in FIG. 2, reception RF section 102 receives a signal from a destination node (which will be described later) or a relay node (which will be described later) via antenna 101. Reception RF section 102 performs reception processing such as down-conversion, A/D conversion on the received signal and outputs the signal after the reception processing to destination node CQI detection section 103 and relay node CQI detection section 104. This signal includes channel quality information (here, CQI (Channel Quality Indicator)) generated at the destination node and relay node respectively.

Destination node CQI detection section 103 detects a CQI generated at the destination node (hereinafter, referred to as "destination node CQI") from the signal inputted from reception RF section 102. On the other hand, relay node CQI detection section 104 detects a CQI generated at the relay node (hereinafter, referred to as "relay node CQI") from the signal inputted from reception RF section 102. Destination node CQI detection section 103 and relay node CQI detection section 104 then output the destination node CQI and the relay node CQI to scheduler 105.

As the channel quality information, not only CQIs but also reception intensity of a pilot signal, reception SNR, reception SINR, reception CIR, reception CINR, variance or standard deviation of a reception SINR or variance or standard deviation of reception CINR may be used.

Scheduler 105 performs scheduling on resources (time resources, frequency resources, space resource, multipath or the like) to be allocated to a transmission signal transmitted from the source node using the destination node CQI and relay node CQI inputted from destination node CQI detection section 103 and relay node CQI detection section 104 respectively. Scheduler 105 then outputs the scheduling result to MCS (Modulation and channel Coding Scheme) determining section 106.

MCS determining section 106 determines a modulation scheme of a transmission signal including a coding rate of data directed to the destination node, a coding rate of data directed to the relay node and data directed to the destination node and data directed to the relay node, based on the scheduling result inputted from scheduler 105. Here, MCS determining section 106 determines the modulation scheme of the transmission signal, and thereby allocates the data directed to the destination node and the data directed to the relay node to an amplitude bit (amplitude information) which is a bit whose value varies when the amplitude of each symbol of the transmission signal changes, and a phase bit (phase information) which is a bit whose value varies when the phase of each symbol of the transmission signal changes among a plurality of bits constituting each symbol of the transmission signal. For example, MCS determining section 106 may select one of a predetermined plurality of constellation patterns to determine a modulation scheme of the transmission signal. Alternatively, MCS determining section 106 may also adaptively determine an arbitrary modulation scheme based on the CQIs inputted via scheduler 105. MCS determining section 106 then outputs MCS information including the determined coding rate and modulation scheme to coding sections 107 and 108, rate matching sections 109 and 110, bit allocation section 111 and modulation section 112.

Coding section 107 performs error correcting coding processing on the data directed to the destination node based on the coding rate indicated in the MCS information inputted from MCS determining section 106, and outputs the coded signal to rate matching section 109.

Coding section 108 performs error correcting coding processing on the data directed to the relay node based on the coding rate indicated in the MCS information inputted from MCS determining section 106, and outputs the coded signal to rate matching section 110.

Instead of coding section 107 and coding section 108, one encoder may perform error correcting coding processing on the data directed to the destination node and data directed to the relay node collectively. That is, source node 100 may multiplex the data directed to the destination node and data directed to the relay node, and perform error correcting coding processing collectively. Generally, there is a characteristic; the longer the unit (data length) in which error correcting decoding is performed, the less is the likelihood of errors. In this case, it is possible to improve the error correcting decoding performance at the relay node, and improve the error rate characteristic more than when performing error correcting coding processing on the data directed to the destination node and data directed to the relay node individually.

Rate matching section 109 performs rate matching processing on the data directed to the destination node inputted from coding section 107 based on the coding rate indicated in the MCS information inputted from MCS determining section 106. Rate matching section 109 then outputs the signal after the rate matching processing (data directed to the destination node) to bit allocation section 111.

Rate matching section 110 performs rate matching processing on the data directed to the relay node inputted from coding section 108, based on the coding rate indicated in the MCS information inputted from MCS determining section 106. Rate matching section 110 then outputs the signal after the rate matching processing (data directed to the relay node) to bit allocation section 111.

Bit allocation section 111 performs bit allocation processing on the data directed to the destination node inputted from rate matching section 109 and the data directed to the relay node inputted from rate matching section 110 based on the modulation scheme indicated in the MCS information inputted from MCS determining section 106. To be more specific, bit allocation section 111 allocates the data directed to the relay node at a bit position corresponding to the amplitude bit among a plurality of bits constituting each symbol of the transmission signal modulated by modulation section 112. Furthermore, bit allocation section 111 allocates the data directed to the destination node at a bit position corresponding to the phase bit among the plurality of bits constituting each symbol of the transmission signal modulated by modulation section 112. Bit allocation section 111 then outputs a bit sequence in which the data directed to the relay node and data directed to the destination node are allocated to modulation section 112.

Modulation section 112 modulates the bit sequence inputted from bit allocation section 111, based on the modulation scheme indicated in the MCS information inputted from MCS determining section 106. That is, modulation section 112 modulates the signal (bit sequence) including the amplitude bit to which the data directed to the relay node is allocated and the phase bit to which the data directed to the destination node is allocated. That is, modulation section 112 modulates the bit sequence according to the modulation scheme using the amplitude and phase. Modulation section 112 then outputs the modulated signal to transmission RF section 113.

Transmission RF section 113 performs transmission processing such as D/A conversion, amplification and up-conversion on the signal inputted from modulation section 112, and transmits the signal after the transmission processing from antenna 101.

Figure 3:
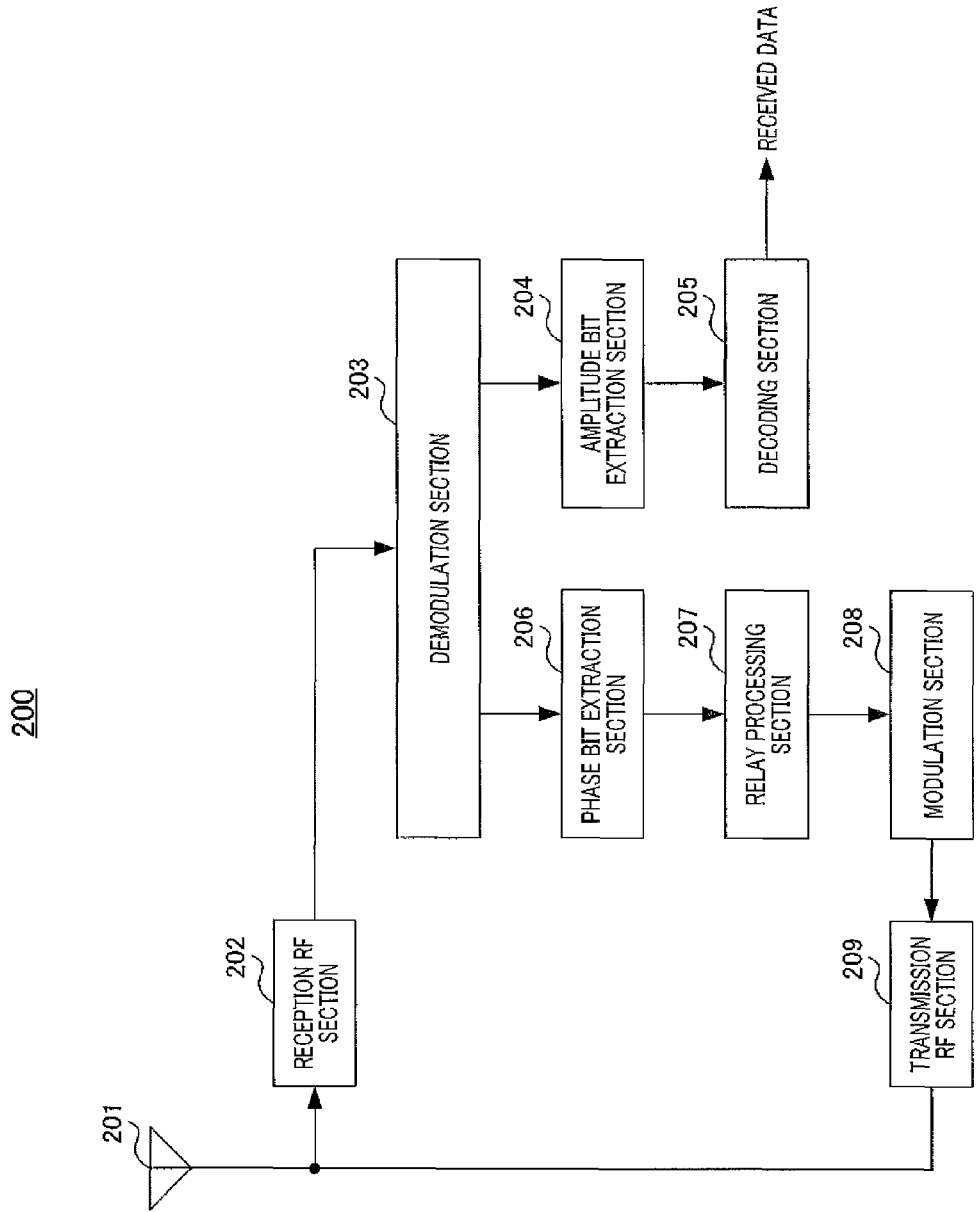
FIG. 3 is a block diagram illustrating a relay node according to Embodiment 1 of the present invention.

Next, the configuration of relay node 200 according to the present embodiment is shown in FIG. 3.

In relay node 200 shown in FIG. 3, reception RF section 202 receives a signal transmitted from source node 100 via antenna 201. Reception RF section 202 then performs reception processing such as down-conversion, A/D conversion on the received signal and outputs the signal after the reception processing to demodulation section 203. The signal transmitted from source node 100 includes data directed to relay node 200 and data directed to the destination node.

Demodulation section 203 demodulates the signal inputted from reception RF section 202 and outputs the demodulated signal (bit sequence) to amplitude bit extraction section 204 and phase bit extraction section 206.

Amplitude bit extraction section 204 extracts the data directed to relay node 200 from the signal (bit sequence) inputted from demodulation section 203. To be more specific, amplitude bit extraction section 204 extracts the amplitude bit among a plurality of bits constituting each symbol of the signal transmitted from source node 100. Amplitude bit extraction section 204 then outputs the extracted amplitude bit (that is, data directed to relay node 200) to decoding section 205.

Decoding section 205 performs error correcting decoding processing on the data directed to relay node 200 inputted from amplitude bit extraction section 204, and outputs the decoding result as received data to a higher layer in relay node 200. That is, decoding section 205 decodes the amplitude bit among a plurality of bits constituting each symbol of the signal demodulated by demodulation section 203 to obtain data directed to the relay node.

Phase bit extraction section 206 extracts data directed to the destination node from the signal (bit sequence) inputted from demodulation section 203. To be more specific, phase bit extraction section 206 extracts the phase bit among a plurality of bits constituting each symbol of the signal transmitted from source node 100. Phase bit extraction section 206 outputs the extracted phase bit (that is, data directed to the destination node) to relay processing section 207.

Relay processing section 207 performs relay processing such as processing of forming the data directed to the destination node inputted from phase bit extraction section 206 into a signal format directed to the destination node which is the relay transmission destination. Relay processing section 207 then outputs the signal after the relay processing to modulation section 208.

Modulation section 208 modulates the signal (that is, data directed to the destination node) inputted from relay processing section 207. That is, modulation section 208 modulates the phase bit among a plurality of bits constituting each symbol of the signal demodulated by demodulation section 203 to generate data directed to the destination node (relay signal). At this time, modulation section 208 modulates the signal according to a modulation scheme with a smaller amplitude variation than the modulation scheme of the signal transmitted from source node 100 (that is, modulation scheme using the amplitude and phase). For example, modulation section 208 modulates the signal according to a modulation scheme using only the phase. Modulation section 208 then outputs the modulated signal to transmission RF section 209.

Transmission RF section 209 performs transmission processing such as D/A conversion, amplification and up-conversion on the signal inputted from modulation section 208 and transmits the signal after the transmission processing from antenna 201 to the destination node.

Figure 4:
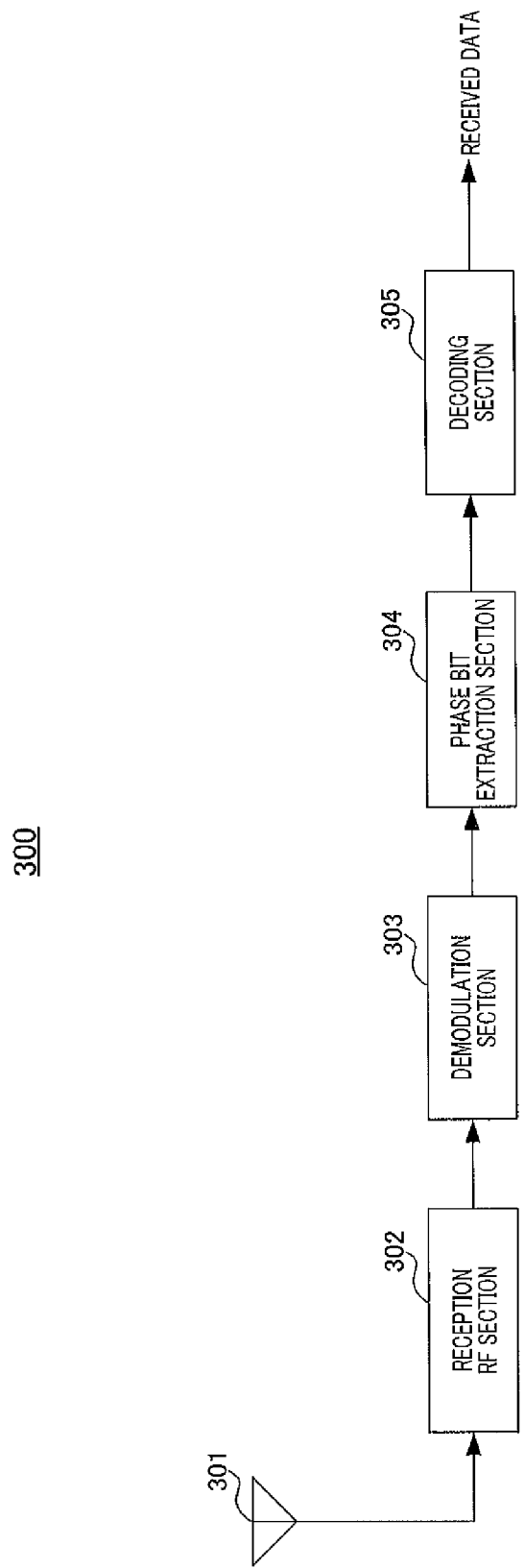
FIG. 4 is a block diagram illustrating a configuration of a destination node according to Embodiment 1 of the present invention.

Next, the configuration of destination node 300 according to the present embodiment is shown in FIG. 4.

In destination node 300 shown in FIG. 4, reception RF section 302 receives a signal (relay signal) transmitted from relay node 200 via antenna 301. Reception RF section 302 performs reception processing such as down-conversion, A/D conversion on the received signal and outputs the signal after the reception processing to demodulation section 303.

Demodulation section 303 demodulates the signal inputted from reception RF section 302, and outputs the demodulated signal (bit sequence) to phase bit extraction section 304.

Phase bit extraction section 304 extracts data directed to destination node 300 from the signal (bit sequence) inputted from demodulation section 303. To be more specific, phase bit extraction section 304 extracts the phase bit which is a bit constituting each symbol of the signal transmitted from relay node 200 (that is, data directed to destination node 300). Phase bit extraction section 304 then outputs the data directed to extracted destination node 300 to decoding section 305.

Decoding section 305 performs error correcting decoding processing on the data directed to destination node 300 inputted from phase bit extraction section 304, and outputs the decoding result as received data to a higher layer in destination node 300. Error correcting decoding processing is necessary when error correcting coding processing is in progress in source node 100 or relay node 200 and error correcting decoding processing is omitted when error correcting coding processing is not in progress in source node 100 or relay node 200.

Furthermore, relay node 200 (FIG. 3) and destination node 300 (FIG. 4) according to the present embodiment estimate a channel between relay node 200 and source node 100, and a channel between destination node 300 and source node 100 using pilot signals transmitted from source node 100 (FIG. 2). Relay node 200 and destination node 300 then generate CQIs (aforementioned relay node CQI and destination node CQI) using the channel estimate values which are the estimation results. Destination node 300 then transmits the CQI information indicating the generated destination node CQI to source node 100 or relay node 200. Furthermore, relay node 200 transmits the generated relay node CQI and the destination node CQI received from destination node 300 to source node 100.

Next, operation of the communication system according to the present embodiment will be described in detail.

In the following description, source node 100 (FIG. 2) transmits a signal made up of three bits per symbol as shown in FIG. 5A. Here, as shown in FIG. 5A, a high-order one bit of the three bits constituting one symbol is an amplitude bit and low-order two bits are phase bits.

That is, the constellation of a transmission signal transmitted from source node 100 is as shown in FIG. 5B. FIG. 5B shows the constellation called "8QAM" (which may be referred to as "8PASK (8 Phase Amplitude Shift Keying"). As shown in FIG. 5B, when the high-order one bit (amplitude bit) of the three bits constituting one symbol is '1', the signal is modulated on an outer circle (ring) and when the high-order one bit (amplitude bit) is '0', the signal is modulated on an inner circle (ring). That is, in 8PSK shown in FIG. 5B, the value of the high-order one bit (amplitude bit) varies as the amplitude of the transmission signal (symbol) changes. That is, the amplitude of the transmission signal is determined only by the value of the amplitude bit independently of the values of the phase bits.

Furthermore, as shown in FIG. 5B, when the low-order two bits (phase bits) of the three bits constituting one symbol are '01', '11', '10' and '00', the signal is modulated in the first to fourth quadrants respectively. That is, in 8PSK shown in FIG. 5B, values of the low-order two bits (phase bits) vary as the phase of the transmission signal (symbol) changes. That is, the phase of the transmission signal is determined only by the values of the phase bits independently of the value of the amplitude bit. For example, as shown in FIG. 5B, in the case of symbols '001' and '101', both phase bits (low-order two bits) are '01' and therefore the signal is modulated in the first quadrant irrespective of the value of the amplitude bit.

As shown in FIG. 5A and FIG. 5B, bit allocation section 111 of source node 100 allocates data r directed to relay node 200 at a bit position corresponding to the high-order one bit (amplitude bit) of three bits constituting each symbol of the transmission signal and allocates data d directed to destination node 300 at hit positions corresponding to the low-order two bits (phase bits). Modulation section 112 then modulates the bit sequence in which data r directed to relay node 200 and data d directed to destination node 300 are allocated as shown in FIG. 5A based on the constellation shown in FIG. 5B.

As shown in FIG. 5C, source node 100 transmits the transmission signal made up of the symbols in the configuration shown in FIG. 5A to relay node 200.

Demodulation section 203 of relay node 200 demodulates the transmission signal transmitted from source node 100. Amplitude bit extraction section 204 extracts the high-order one bit (r) which is the amplitude bit of the three bits constituting each symbol shown in FIG. 5A, and decoding section 205 decodes the amplitude bit. Relay node 200 thereby obtains data r directed to relay node 200.

On the other hand, phase bit extraction section 206 of relay node 200 extracts the low-order two bits (d, d) which are phase bits of the three bits constituting each symbol shown in FIG. 5A. Modulation section 208 of relay node 200 modulates the phase bits (data directed to destination node 300).

At this time, modulation section 208 modulates the phase bits (low-order two bits) shown in FIG. 5A using QPSK expressed by four phases. In other words, modulation section 208 modulates the phase bits using QPSK (modulation scheme using only phases) which is a modulation scheme with a smaller amplitude variation than 8PASK (modulation scheme using amplitude and phases) which is a modulation scheme for the transmission signal transmitted from source node 100. To be more specific, modulation section 208 modulates only the phase bits (low-order two bits) using QPSK expressed by four phases irrespective of the value of the amplitude bit of the transmission signal transmitted from source node 100. As a result, the relay signal, which is relayed, becomes a QPSK signal expressed by two bits per symbol, that is, by four phases.

Thus, relay node 200 can relay to destination node 300, the low-order two bits (phase bits) of the three bits constituting each symbol of the transmission signal transmitted from source node 100 just as they are. In other words, relay node 200 does not relay the high-order one bit which is the amplitude bit among the three bits constituting each symbol of the transmission signal transmitted from source node 100.

That is, as shown in FIG. 5C, relay node 200 relays a relay signal only including the phase bits (d, d) (data directed to destination node 300) to destination node 300. As shown in FIG. 5C, destination node 300 receives the phase bits (d, d) from relay node 200, decodes the received phase bits and thereby obtains data directed to destination node 300.

Figure 6:
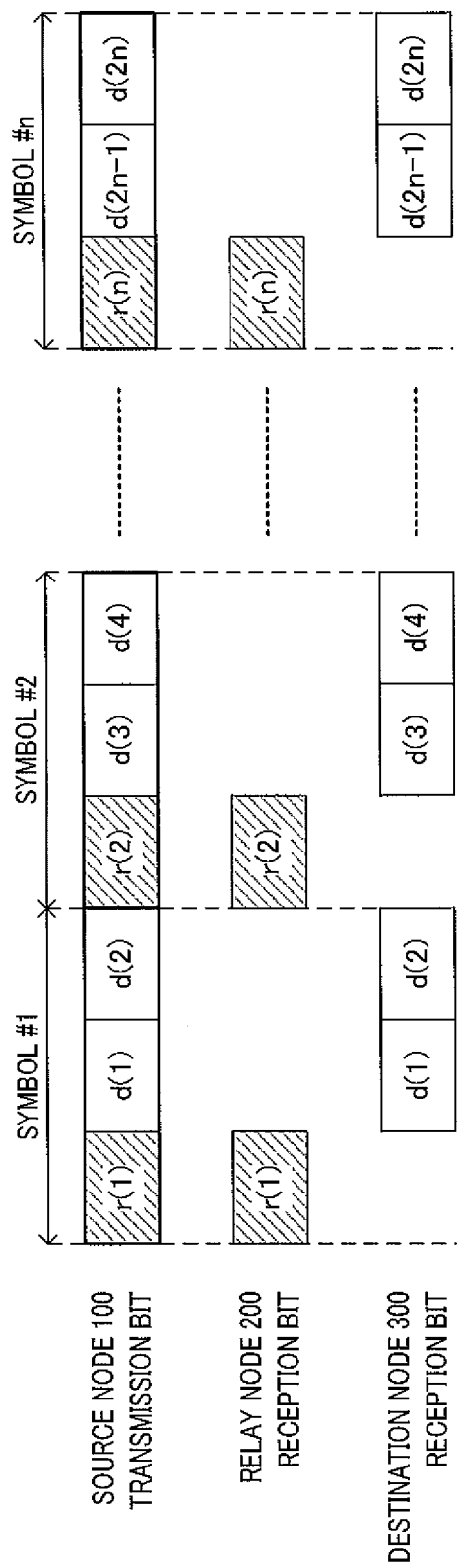
FIG. 6 is a diagram illustrating a specific example of relay processing in the communication system according to Embodiment 1 of the present invention.

Here, to be more specific, as shown in FIG. 6, a case will be described where data directed to relay node 200 are r(1), r(2), . . . , r(n) and data directed to destination node 300 are d(1), d(2), . . . , d(2n).

As shown in FIG. 5A, of the three bits constituting each symbol, the high-order one bit is an amplitude bit and the low-order two bits are phase bits. Thus, as shown in FIG. 6, source node 100 allocates data r(1) directed to relay node 200 to the high-order one bit of the three bits constituting symbol #1 and allocates data d(1) and d(2) directed to destination node 300 to the low-order two bits. Similarly, as shown in FIG. 6, source node 100 allocates data r(2) directed to relay node 200 to the high-order one bit of the three bits constituting symbol #2 and allocates data d(3) and d(4) directed to destination node 300 to the low-order two bits. The same applies to symbols #3 to #n.

That is, as shown in FIG. 6, of 3n transmission bits transmitted with symbols #1 to #n from source node 100, n bits are data directed to relay node 200 and 2n bits are data directed to destination node 300.

Thus, source node 100 modulates the transmission signal using 8PASK which is a modulation scheme using amplitude and phase, and transmits the signal to relay node 200. Upon receiving the transmission signal modulated using 8PASK, relay node 200 modulates only the phase bits included in each symbol of the transmission signal according to a modulation scheme having a smaller amplitude variation than in 8PASK (here QPSK using only phase), and relays the signal to destination node 300.

Here, examples of operation of the radio transmission amplifier in the transmission circuit (transmission RF section 209 shown in FIG. 3) include "linear operation" in which the output voltage varies depending on a supply voltage of the radio transmission amplifier, and "limiter operation" in which the output voltage is constant (saturation state) irrespective of the supply voltage of the radio transmission amplifier.

Furthermore, in the transmission circuit, power consumption of the radio transmission amplifier does not depend on the output voltage of the radio transmission amplifier, but only depends on the supply voltage. By contrast, transmission power of the signal transmitted from the transmitting antenna depends on the output voltage of the radio transmission amplifier. Thus, when the output voltage (average output voltage) of the radio transmission amplifier is kept constant (when the transmission power of the signal transmitted from the transmitting antenna is kept constant), the difference between the energy corresponding to the supply voltage of the radio transmission amplifier (that is, power consumption of the radio transmission amplifier) and energy corresponding to the actual instantaneous output voltage (that is, transmission power of the signal) becomes useless energy (power).

For example, in the linear operation, the radio transmission amplifier causes the output voltage to vary centered on the set average output voltage. That is, in the linear operation, the radio transmission amplifier needs to output a higher output voltage than the average output voltage. Thus, the difference between the energy equivalent to the supply voltage corresponding to a maximum output voltage to be outputted to keep the average output voltage constant (that is, power consumption of the radio transmission amplifier) and the energy equivalent to an instantaneous output voltage at each time (that is, transmission power of the transmission signal) becomes useless. Furthermore, in the linear operation, even when the average output voltage is identical, the greater the amplitude variation of the output voltage, the greater the maximum output voltage, and therefore useless energy (useless power) increases further.

By contrast, in the limiter operation in which the output voltage is constant irrespective of the supply voltage of the radio transmission amplifier (without amplitude variation), the radio transmission amplifier can continue to supply the same output voltage as the set average output voltage. For this reason, in the limiter operation, there is substantially no difference between the energy equivalent to the supply voltage corresponding to the maximum output voltage to be outputted to keep the average output voltage constant (that is, power consumption of the radio transmission amplifier) and the energy equivalent to the instantaneous output voltage at each time (that is, transmission power of the transmission signal) and useless energy (useless power) is extremely small.

That is, the limiter operation has higher power efficiency of the radio transmission amplifier than the linear operation, and can transmit a signal with less power consumption than the linear operation. Furthermore, of the linear operation, linear operation having a smaller amplitude variation has higher power efficiency of the radio transmission amplifier than linear operation having a greater amplitude vibration and can transmit a signal with less power consumption.

However, transmission through the linear operation (hereinafter, referred to as "linear transmission") can change the amplitude of the output voltage, and can thereby transmit both amplitude information (amplitude bit) and phase information (phase bits) in the transmission signal. On the other hand, transmission through the limiter operation (hereinafter, referred to as "limiter transmission") has constant amplitude of the output voltage, and can transmit only phase information (phase bits) in the transmission signal.

Therefore, in the aforementioned modulation scheme using both phase and amplitude, it is necessary to perform linear transmission not limiter transmission. By contrast, in the modulation scheme using only phase, it is possible to use both linear transmission and limiter transmission.

Here, relay node 200 uses QPSK (modulation scheme using only phase) which is a modulation scheme with smaller amplitude variation than 8PASK (modulation scheme using amplitude and phase) which is a modulation scheme for a transmission signal from source node 100 during relay transmission. Thus, when a relay signal is linear-transmitted using QPSK during relay transmission, the amplitude variation of the radio transmission amplifier becomes smaller than the modulation scheme (8PASK) for the transmission signal from source node 100, and it is possible to improve power efficiency of the radio transmission amplifier. Furthermore, when a relay signal is limiter-transmitted using a modulation scheme having a constant amplitude characteristic such as GMSK (Gaussian filtered Minimum Shift Keying) or FSK (Frequency Shift Keying) during relay transmission, relay node 200 can further improve the power efficiency of the radio transmission amplifier compared to linear transmission.

Thus, relay node 200 only relays a signal having phase bits (phase information) as the relay signal (data directed to destination node 300). This allows relay node 200 to change the modulation scheme in relay transmission to a modulation scheme with a smaller amplitude variation than the modulation scheme of a transmission signal from source node 100. It is thereby possible to improve power efficiency of the radio transmission amplifier (transmission RF section 209) of relay node 200. That is, relay node 200 can suppress useless power consumption produced in relay processing. Moreover, relay node 200 transmits a relay signal modulated according to a modulation scheme using only phase through limiter operation, and can thereby suppress an increase of useless power consumption produced in relay processing compared to that during transmission through linear operation.

Therefore, the present embodiment reduces power consumption required for relay processing in a mobile station having a relay function (relay node 200 in the present embodiment), and can thereby suppress a decrease in charge capacity of the battery when performing relay processing on the signal directed to another mobile station. Thus, the present embodiment relays a signal of the other mobile station while transmitting/receiving a signal of the mobile station having the relay function (relay node 200), and can thereby increase system capacity in the entire mobile communication system. That is, the present embodiment reduces power consumption required for relay processing in the mobile station having the relay function, and can thereby increase system capacity.

Furthermore, in the present embodiment, source node 100 allocates data directed to relay node 200 to the amplitude bit and allocates data directed to destination node 300 to the phase bits. Here, as shown in FIG. 5B, a determination axis for an amplitude bit is located between symbols in each quadrant. For example, in the first quadrant shown in FIG. 5B, a determination axis for determining two symbols is located between '001' and '101'. By contrast, a determination axis for phase bits is located on a boundary between quadrants. That is, 8PASK has a feature that amplitude bits are more error-prone than phase bits. However, the distance from source node 100 to relay node 200 is assumed to be shorter than the distance from source node 100 to destination node 300. That is, data directed to relay node 200 is less error-prone than data directed to destination node 300 when the communication distance is taken into consideration. Thus, even when source node 100 allocates data directed to relay node 200 to the amplitude bit (bit which is more error-prone than phase bit), there is a higher possibility that relay node 200 may be able to reliably receive data directed to relay node 200 allocated to the amplitude bit.

Furthermore, in the present embodiment, destination node 300 extracts only phase bits of the signal relayed from relay node 200. Here, the circuit that extracts only phase bits can perform delay detection on a differentially coded/modulated signal. Thus, the circuit that extracts only phase bits (the circuit that can perform delay detection) has a simpler circuit configuration than a circuit that performs coherent detection. That is, the circuit that extracts only phase bits has a simpler circuit configuration than a circuit that extracts both of the amplitude bit and phase bit. It is thereby possible to prevent the circuit configuration of destination node 300 from increasing. For example, when a mobile station is provided with a relay function, even if the circuit scale increases by an addition of the relay processing related circuit (that is, the circuit corresponding to relay node 200), it is possible to prevent the circuit scale of the entire mobile station from increasing by simplifying the reception circuit provided in the mobile station (that is, the circuit corresponding to destination node 300).

Embodiment 2

The present embodiment will describe a case where a source node (radio transmitting apparatus) further transmits broadcast data which is data directed to a plurality of receiving nodes.

Hereinafter, the present embodiment will be described more specifically. Bit allocation section 111 of source node 100 according to the present embodiment (FIG. 2) further performs bit allocation processing on broadcast data inputted from an input section (not shown) in addition to data directed to destination node 300, and data directed to relay node 200 as in the case of Embodiment 1. Here, the broadcast data is transmitted to a plurality of receiving nodes (hereinafter, referred to as "broadcast data receiving nodes") including destination data.

To be more specific, bit allocation section 111 allocates data directed to a relay node at a bit position corresponding to an amplitude bit among a plurality of bits constituting each symbol of a transmission signal as in the case of Embodiment 1. On the other hand, bit allocation section 111 allocates data directed to the relay node and broadcast data at bit positions corresponding to phase bits among a plurality of bits constituting each symbol of the transmission signal.

For example, as shown in FIG. 7, source node 100 transmits a signal made up of three bits per symbol as in the case of Embodiment 1. Furthermore, as shown in FIG. 7, of the three bits constituting one symbol, a high-order one bit is an amplitude bit and low-order two bits are phase bits.

Thus, bit allocation section 111 allocates data r directed to relay node 200 at a bit position corresponding to a high-order one bit (amplitude bit) of the 3 bits constituting each symbol of the transmission signal as shown in FIG. 7. Furthermore, bit allocation section 111 allocates broadcast data b and data d directed to destination node 300 at bit positions corresponding to the low-order two bits (phase bits) of the three bits constituting each symbol of the transmission signal in descending order of bits. As shown in FIG. 7, modulation section 112 modulates a bit sequence in which data r directed to relay node 200, broadcast data b and data d directed to destination node 300 are allocated based on the constellation shown in FIG. 5B.

Figure 8:
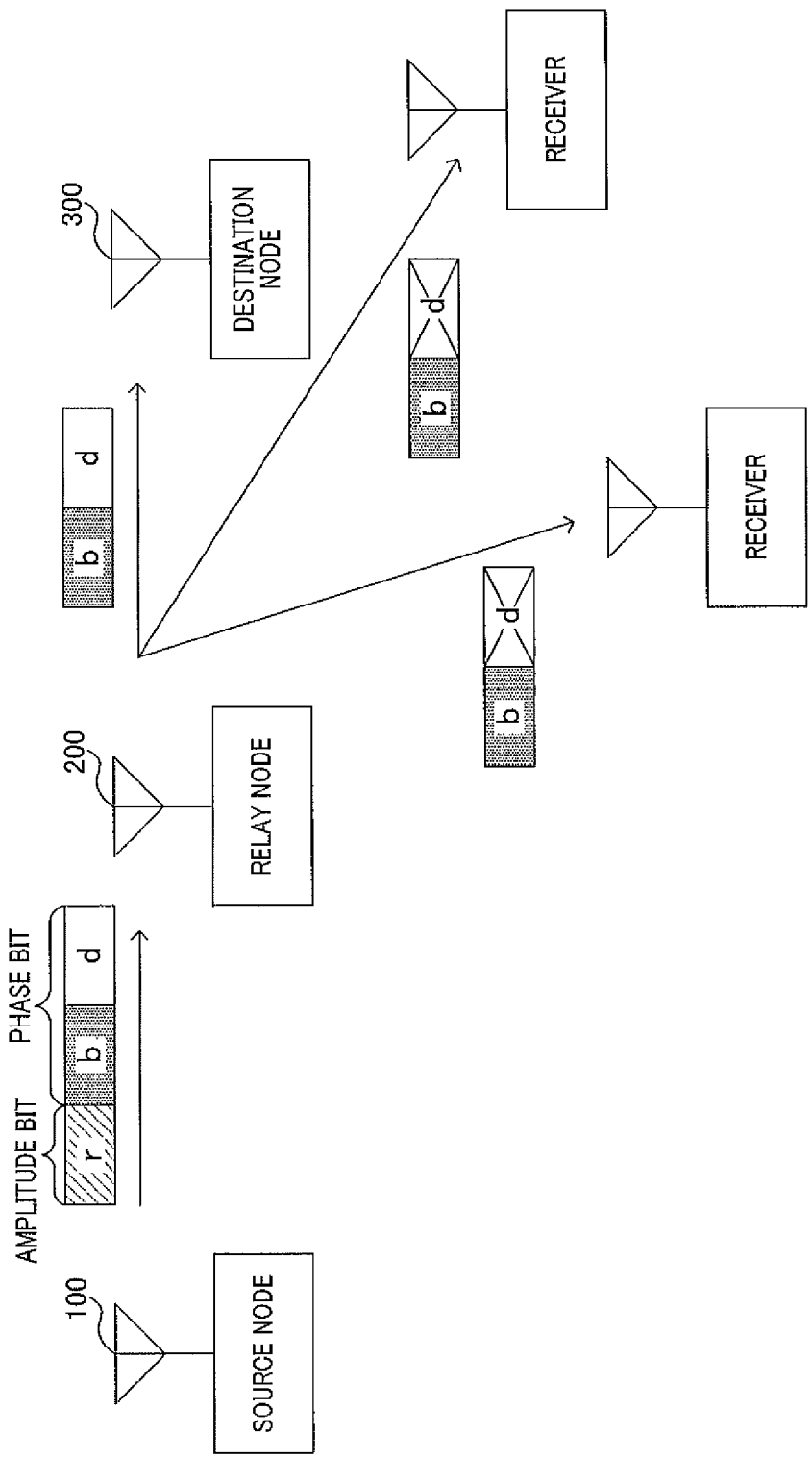
FIG. 8 is a diagram illustrating relay processing in a communication system according to Embodiment 2 of the present invention.

Source node 100 then transmits the transmission signal in which data (r, b, d) are allocated to the three bits making up one symbol to relay node 200 in descending order of bits as shown in FIG. 8.

Next, amplitude bit detection section 204 (FIG. 3) of relay node 200 according to the present embodiment extracts the high-order one bit (r) which is the amplitude bit among a plurality of bits constituting each symbol of the transmission signal as in the case of Embodiment 1. Decoding section 205 then decodes the amplitude bit and thereby obtains data r directed to relay node 200.

On the other hand, phase bit extraction section 206 extracts the phase bits (broadcast data b and data d directed to destination node 300 shown in FIG. 7) among the plurality of bits constituting each symbol of the transmission signal. That is, relay node 200 relays only the phase bits (b, d) of the transmission signal transmitted from source node 100 as shown in FIG. 8. Thus, relay node 200 transmits data d to destination node 300, and at the same time transmits data b to nodes other than destination node 300 (receivers in FIG. 8).

At this time, modulation section 208 of relay node 200 modulates the phase bits (broadcast data b and data d directed to destination node 300) according to a modulation scheme (e.g., QPSK (modulation scheme using only phase)) having a smaller amplitude variation than the modulation scheme (e.g., 8PASK (modulation scheme using amplitude and phase)) of the transmission signal transmitted from source node 100 as in the case of Embodiment 1.

Next, destination node 300 according to the present embodiment (FIG. 4) receives broadcast data b and data d directed to destination node 300 constituting each symbol of the relay signal transmitted from relay node 200 as shown in FIG. 8.

On the other hand, the receivers (broadcast data receiving nodes) shown in FIG. 8 extract broadcast data b of bits constituting each symbol of the relay signal transmitted from relay node 200, and also receive only broadcast data b by discarding (shown by X in FIG. 8) data d directed to destination node 300.

Thus, source node 100 modulates the transmission signal according to a modulation scheme (e.g., 8PASK) using amplitude and phase, and transmits the transmission signal to relay node 200 as in the case of Embodiment 1. However, source node 100 allocates broadcast data directed to a plurality of broadcast data receiving nodes and individual data directed to the destination node to the phase bits among a plurality of bits constituting each symbol of the transmission signal. Thus, relay node 200 relays only phase bits included in each symbol of the transmission signal from source node 100, and can thereby relay not only data directed to destination node 300 but also broadcast data to a plurality of broadcast data receiving nodes as in the case of Embodiment 1.

At this time, in the same way as in Embodiment 1, relay node 200 modulates the phase bits included in each symbol of the transmission signal from source node 100 using a modulation scheme (e.g., QPSK) with a smaller amplitude variation than the modulation scheme (e.g., 8PASK) of the transmission signal, and relays the phase bits. Thus, according to the present embodiment, relay node 200 can suppress an increase of useless power consumption in not only relay processing of data directed to destination node 300 but also relay processing of broadcast data. That is, relay node 200 can reduce power consumption required for relay processing on a plurality of broadcast data receiving nodes.

Thus, the present embodiment reduces power consumption required for relay processing in a mobile station having a relay function (relay node), and can thereby increase system capacity as in the case of Embodiment 1. Furthermore, according to the present embodiment, the mobile station having the relay function can also suppress power consumption required when relaying broadcast data to a plurality of broadcast data receiving nodes.

In the present embodiment, the allocation positions and the number of bits of broadcast data and data directed to the destination node in the phase bits among a plurality of bits constituting each symbol of the transmission signal transmitted from source node 100 are not limited to the case shown in FIG. 7. That is, the allocation positions and the number of bits of broadcast data and data directed to the destination node in the phase bits may be changed arbitrarily. For example, when there is no data directed to the destination node transmitted from source node 100, source node 100 may allocate only broadcast data in the phase bits and transmit the broadcast data. Alternatively, source node 100 may adaptively change the allocation positions and the number of bits of broadcast data and data directed to the destination node in the phase bits according to CQIs received from the destination node and broadcast data receiving node respectively. This allows the destination node and broadcast data receiving node to receive data more reliably.

Embodiment 3

The present embodiment will describe a case where a source node (radio transmitting apparatus) transmits data directed to a relay node (radio relay apparatus) using not only an amplitude bit but also some of phase bits among a plurality of bits constituting each symbol of a transmission signal.

Hereinafter, the present embodiment will be described more specifically. Bit allocation section 111 (FIG. 2) of source node 100 according to the present embodiment allocates data directed to relay node 200 at a bit position corresponding to an amplitude bit and bit positions corresponding to some of phase bits among a plurality of bits constituting each symbol of a transmission signal. On the other hand, bit allocation section 111 allocates data directed to relay node 200 at bit positions corresponding to bits other than the above-described some bits (bits to which data directed to relay node 200 is allocated) among the plurality of bits constituting each symbol of the transmission signal.

Figure 9:
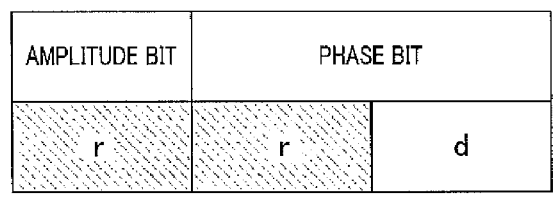
FIG. 9 is a diagram illustrating bits constituting each symbol of a signal transmitted from a source node according to Embodiment 3 of the present invention.

For example, as shown in FIG. 9, source node 100 transmits a signal made up of three bits per symbol as in the case of Embodiment 1. Furthermore, as shown in FIG. 9, of the three bits constituting one symbol, a high-order one bit is an amplitude bit and low-order two bits are phase bits.

As shown in FIG. 9, bit allocation section 111 allocates data r directed to relay node 200 at bit positions corresponding to high-order two bits (amplitude bit and one of phase bits) among the three bits constituting each symbol of the transmission signal. Furthermore, as shown in FIG. 9, bit allocation section 111 allocates data d directed to destination node 300 at a bit position corresponding to the low-order one bit (bit other than the one bit to which the data directed to relay node 200 is allocated among the phase bits) among the three bits constituting each symbol of the transmission signal. That is, source node 100 allocates two bits (one amplitude bit and one phase bit) among the three bits constituting each symbol of the transmission signal to the data directed to relay node 200 and allocates the remaining one bit (one phase bit) to the data directed to destination node 300. Modulation section 112 modulates a bit sequence in which data (r, r) directed to relay node 200 and data d directed to destination node 300 are allocated as shown in FIG. 9, based on the constellation shown in FIG. 5B.

Figure 10:
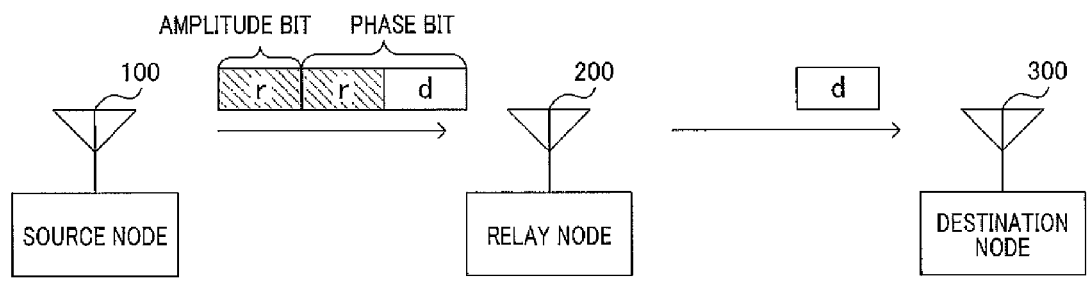
FIG. 10 is a diagram illustrating relay processing in a communication system according to Embodiment 3 of the present invention.

Source node 100 then transmits the transmission signal with data (r, r, d) allocated to the three bits constituting one symbol, as shown in FIG. 10, to relay node 200.

Next, amplitude bit extraction section 204 (FIG. 3) of relay node 200 according to the present embodiment extracts the high-order one bit (r) which is the amplitude bit among the plurality of bits constituting each symbol of the transmission signal. Furthermore, phase bit extraction section 206 extracts the phase bits (r and d shown in FIG. 9) among the plurality of bits constituting each symbol of the transmission signal.

Relay node 200 then decodes the amplitude bit (r shown in FIG. 9) and one of the phase bits (r shown in FIG. 9) among the plurality of extracted bits, and thereby obtains data directed to relay node 200. Furthermore, relay node 200 relays the bit (d) other than the above-described one bit (r) of the phase bits among the plurality of extracted bits. That is, relay node 200 relays only one bit (d) of the phase bits, that is, the bit other than the data (r) directed to relay node 200 of the phase bits, of the transmission signal transmitted from source node 100 as shown in FIG. 10.

At this time, modulation section 208 of relay node 200 modulates one bit (data d directed to destination node 300) of the phase bits using a modulation scheme (e.g., BPSK (modulation scheme using only phase)) with a smaller amplitude variation than the modulation scheme (e.g., 8PASK (modulation scheme using amplitude and phase)) of the transmission signal transmitted from source node 100 as in the case of Embodiment 1. That is, the number of bits (one bit) constituting one symbol generated in modulation section 208 in the present embodiment is smaller compared to the constellation (QPSK: two bits per symbol) during the relay of relay node 200 in Embodiment 1. For example, modulation section 208 modulates one of the phase bits (data d directed to destination node 300) using BPSK.

Next, destination node 300 (FIG. 4) according to the present embodiment receives data d directed to destination node 300 constituting each symbol of the relay signal transmitted from relay node 200 as shown in FIG. 10.

Thus, source node 100 allocates data directed to relay node 200 not only to the amplitude bit but also to one of the phase bits among the plurality of bits constituting each symbol of the transmission signal. That is, source node 100 can allocate data directed to relay node 200 to any one bit among the plurality of bits constituting each symbol of the transmission signal. This allows source node 100 to adaptively change the proportion of the number of bits of the data directed to the relay node and data directed to the destination node among the plurality of bits constituting each symbol of the transmission signal.

However, as shown in FIG. 9, data d directed to destination node 300 (that is, relayed signal) is allocated to only the phase bits as in the case of Embodiment 1 (e.g., FIG. 5A). Therefore, relay node 200 may modulate only one phase bit (only d shown in FIG. 9) among the plurality of bits constituting each symbol of the transmission signal from source node 100 using a modulation scheme (e.g., BPSK) with a smaller amplitude variation than the modulation scheme (e.g., 8PASK) of the transmission signal, and relay the modulated phase bit as in the case of Embodiment 1.

That is, even when the proportion of the number of bits among the plurality of bits constituting each symbol of the transmission signal is adaptively changed, source node 100 may not have to allocate data directed to destination node 300 to the amplitude bit. Thus, relay node 200 never loses the effect of improving power consumption efficiency of the aforementioned radio transmission amplifier (transmission RF section 209 shown in FIG. 3).

Thus, according to the present embodiment, source node 100 allocates data directed to relay node 200 to the amplitude bit and one of the phase bits among a plurality of bits constituting each symbol of the transmission signal. However, source node 100 allocates data directed to destination node 300 to only the phase bits among the plurality of bits constituting each symbol of the transmission signal as in the case of Embodiment 1. This makes it possible to transmit more data directed to relay node 200 without reducing power efficiency during relay transmission in relay node 200. Therefore, the present embodiment can reduce power consumption required for relay processing in a mobile station (relay node) having a relay function, and thereby increase system capacity as in the case of Embodiment 1. Furthermore, the present embodiment can adaptively change data allocation (bit allocation in one symbol) of data directed to relay node 200 and data directed to destination node 300.

Embodiment 4

The present embodiment will describe a case where a signal indicating control information (control channel) to control operation of relay processing at a relay node is transmitted as the aforementioned data directed to the relay node (radio relay apparatus).

Figure 11:
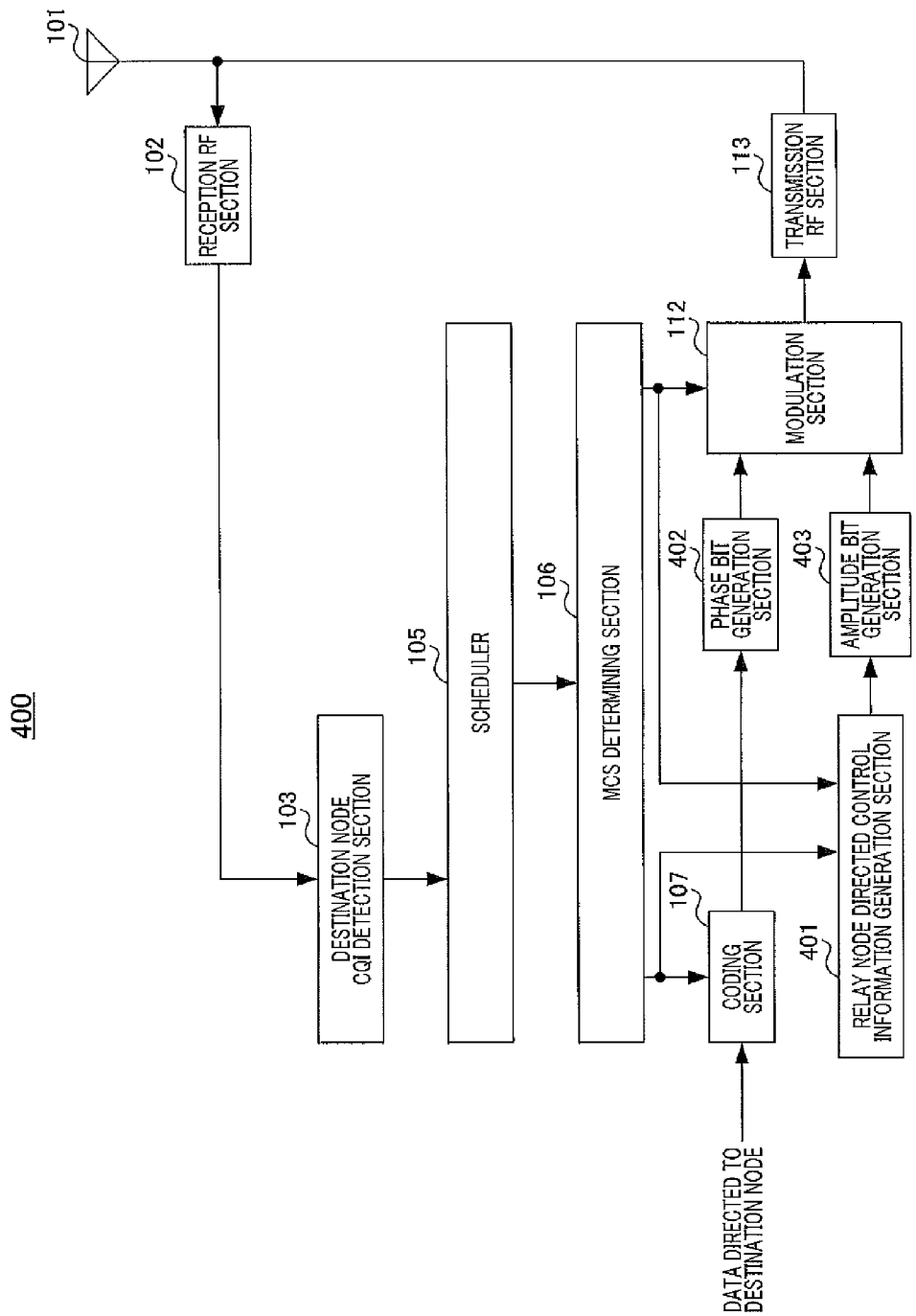
FIG. 11 is a block diagram illustrating a configuration of a source node according to Embodiment 4 of the present invention.

Hereinafter, the present embodiment will be described more specifically. FIG. 11 shows a configuration of source node 400 according to the present embodiment. In FIG. 11, the same components as those in Embodiment 1 (FIG. 2) will be assigned the same reference numerals and descriptions thereof will be omitted.

In source node 400 shown in FIG. 11, a destination node CQI is inputted to scheduler 105 from destination node CQI detection section 103. Scheduler 105 performs scheduling on resources allocated to a transmission signal transmitted from source node 400 using the destination node CQI. MCS determining section 106 then determines a coding rate and modulation scheme of data directed to the destination node based on the scheduling result inputted from scheduler 105. Furthermore, MCS determining section 106 outputs MCS information including the determined coding rate and modulation scheme to coding section 107, modulation section 112 and relay node directed control information generation section 401.

Relay node directed control information generation section 401 generates control information including the MCS information or the like inputted from MCS determining section 106. Relay node directed control information generation section 401 outputs the generated control information to amplitude bit generation section 403.

Phase bit generation section 402 performs control so that data directed to the destination node inputted from coding section 107 is allocated at bit positions corresponding to phase bits among a plurality of bits constituting each symbol of the transmission signal transmitted from source node 400. That is, phase bit generation section 402 generates phase bits including data directed to the destination node.

Amplitude bit generation section 403 performs control so that control information inputted from relay node directed control information generation section 401 is allocated at a bit position corresponding to the amplitude bit among a plurality of bits constituting each symbol of the transmission signal transmitted from source node 400. That is, amplitude bit generation section 403 generates the amplitude bit including control information.

Source node 400 may also use bit allocation section 111 described in Embodiment 1 instead of phase bit generation section 402 and amplitude bit generation section 403. That is, bit allocation section 111 provided in source node 400 may allocate data directed to the destination node at a bit position corresponding to the phase bit and allocate control information at a bit position corresponding to the amplitude bit.

Figure 12:
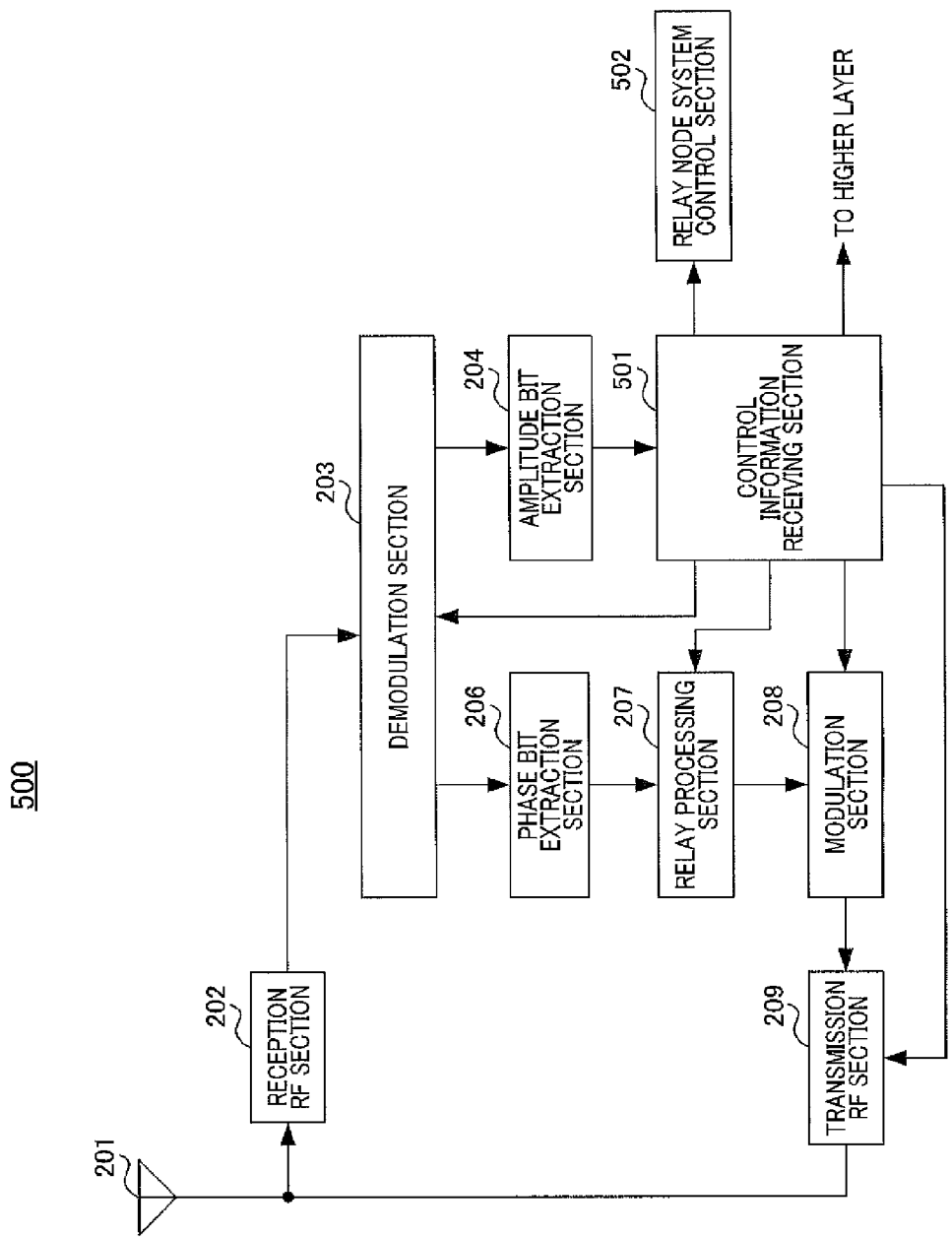
FIG. 12 is a block diagram illustrating a configuration of a relay node according to Embodiment 4 of the present invention.

Next, FIG. 12 shows the configuration of relay node 500 according to the present embodiment. In FIG. 12, the same components as those in Embodiment 1 (FIG. 3) will be assigned the same reference numerals and descriptions thereof will be omitted.

In relay node 500 shown in FIG. 12, control information receiving section 501 controls operation of the relay processing in relay node 500 based on a signal inputted from amplitude bit extraction section 204, that is, the control information directed to relay node 500 transmitted from source node 400.

In addition to the aforementioned MCS information, the control information includes, for example, the demodulation scheme in demodulation section 203, relay scheme (e.g., instruction information instructing any one of decode and forward type and amplitude and forward type) in relay processing section 207, modulation scheme (e.g., the number of phases or constellation candidates) in modulation section 208, operating mode in transmission RF section 209, system control information for controlling the entire system of relay node 500 and control information for a higher layer. Furthermore, the control information may also include information indicating a control channel relating to data directed to relay node 500 or information indicating a control channel relating to data directed to the destination node. In this case, control information receiving section 501 controls demodulation section 203, relay processing section 207, modulation section 208, transmission RF section 209, that is, relay processing of data directed to destination node 300 according to the instruction from source node 400 indicated in the control information directed to relay node 500. Furthermore, control information receiving section 501 controls relay node system control section 502 and higher layer according to the instruction from source node 400 indicated in the control information directed to relay node 500.

In the present embodiment, relay node 500 extracts control information directed to relay node 500 (control information including information relating to relay processing) from the amplitude bit among a plurality of bits constituting each symbol of the transmission signal transmitted from source node 400, and extracts data directed to destination node 300 from the phase bits. Relay node 500 relays data directed to destination node 300 based on an instruction from source node 400 indicated in the control information.

Thus, according to the present embodiment, relay node 500 reduces power consumption required for relay processing of data directed to destination node 300, and can thereby increase system capacity as in the case of Embodiment 1. Furthermore, the present embodiment allocates control information directed to relay node 500 to the amplitude bit among a plurality of bits constituting each symbol of the transmission signal transmitted from source node 400. Thus, the present embodiment controls the relay operation in relay node 500 symbol by symbol, and can thereby control operation of the relay processing more meticulously than Embodiment 1.

In the present embodiment, the control information directed to the relay node may include information indicating an ON/OFF setting (ON/OFF setting information) of the relay function in relay node 500. For example, as shown in FIG. 13, of the three bits (b0, b1, b2) constituting each symbol of the transmission signal, suppose amplitude bit b0 is ON/OFF setting information and phase bits b1 and b2 are data. Here, as shown in FIG. 13, when the ON/OFF setting information is '0', suppose phase bits b1 and b2 are data directed to the relay node (that is, the relay function of relay node 500: OFF). On the other hand, when the ON/OFF setting information is '1', suppose phase bits b1 and b2 are data directed to the destination node (that is, the relay function of relay node 500: ON). Therefore, when ON/OFF setting information b0 out of the three bits (b0, b1, b2) constituting each symbol of the transmission signal from source node 400 is '0', relay node 500 receives phase bits b1 and b2 as data directed to relay node 500. On the other hand, when ON/OFF setting information b0 out of the three bits (b0, b1, b2) constituting each symbol of the transmission signal from source node 400 is '1', relay node 500 relays phase bits b1 and b2 as data directed to destination node 300. This allows source node 400 to adaptively change data to be transmitted according to the situation of data directed to relay node 500 and data directed to destination node 300.

Figure 14:
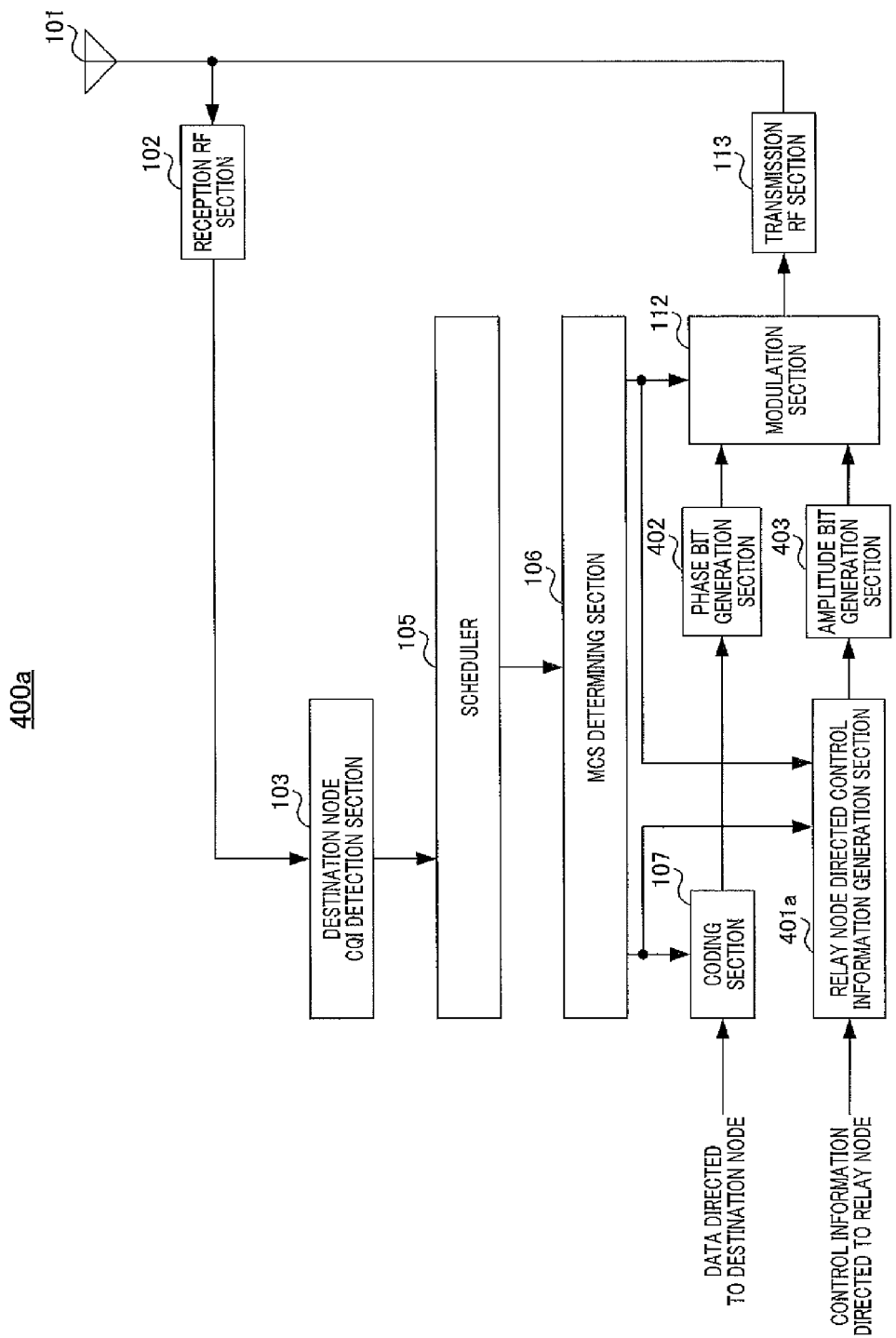
FIG. 14 is a block diagram illustrating another configuration of the source node according to Embodiment 4 of the present invention.

Furthermore, the present embodiment may allocate control information directed to the relay node inputted from a higher layer in source node 400a shown in FIG. 14 to the amplitude bit among a plurality of bits constituting each symbol of the transmission signal. For example, relay node directed control information generation section 401a of source node 400a shown in FIG. 14 may generate one or both of MCS information inputted from MCS determining section 106 and control information inputted from the higher layer, as control information directed to the relay node.

Furthermore, by combining the present embodiment and Embodiment 2, information relating to the ratio between broadcast data and data directed to the destination node within phase bits and a configuration thereof (e.g., the number of bits and allocation position) may be included as control information directed to the relay node.

Furthermore, by combining the present embodiment and Embodiment 3, the control information directed to the relay node may be allocated not only to the amplitude bit but also to some of the phase bits, among a plurality of bits constituting each symbol of the transmission signal.

Embodiment 5

The present embodiment will describe a case where a polar modulation circuit is used as a circuit constituting a transmission RF section of a relay node (radio relay apparatus).

The following description will describe a case where the operating mode in transmission RF section 209 (FIG. 3) of relay node 200 according to the present embodiment is a limiter operation.

Figure 15:
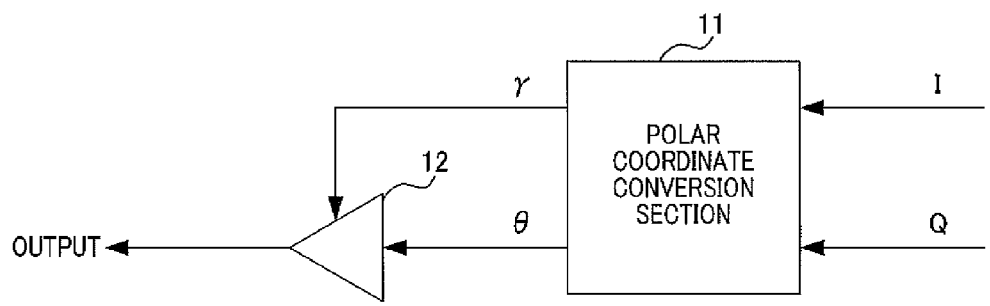
FIG. 15 is a diagram illustrating a general polar modulation circuit.

Here, FIG. 15 shows general polar modulation circuit 10. Here, for example, a signal modulated in modulation section 208 of relay node 200 is expressed using an I (in-phase) component and Q (quadrature) component on an orthogonal coordinate plane as shown in FIG. 15.

In polar modulation circuit 10 shown in FIG. 15, polar coordinate conversion section 11 performs polar coordinate conversion on the modulated signal (I component, Q component) to obtain amplitude information γ and phase information θ. Polar coordinate conversion section 11 then outputs amplitude information γ to the terminal of an input voltage of saturation amplifier 12, and outputs phase information θ to the terminal of an input signal of saturation amplifier 12. Saturation amplifier 12 then amplifies phase information θ inputted to the terminal of the input signal based on amplitude information γ inputted to the terminal of the input voltage.

Here, as described above, in relay node 200, a signal (data directed to destination node 300) to be relayed out of the transmission signal transmitted from source node 100 is allocated to only the phase bit (that is, phase information θ shown in FIG. 15). Therefore, only phase information θ (data directed to the destination node) is inputted to transmission RF section 209 from modulation section 208.

Furthermore, in the present embodiment, since the operating mode in transmission RF section 209 is limiter operation, the amplitude of the signal to be relayed (data directed to destination node 300) has a constant and maximum value. Therefore, amplitude information γ=MAX which indicates a constant and maximum amplitude value is inputted as an input voltage of the saturation amplifier to the polar modulation circuit constituting transmission RF section 209.

Figure 16:
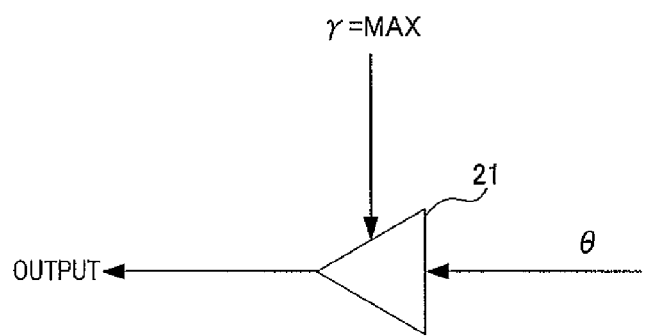
FIG. 16 is a block diagram illustrating a configuration of a polar modulation circuit in the transmission RF section of the relay node according to Embodiment 4 of the present invention.

Thus, polar modulation circuit 20 constituting transmission RF section 209 (FIG. 3) of relay node 200 in the present embodiment is as shown in FIG. 16. That is, polar modulation circuit 20 is provided with only saturation amplifier 21. Furthermore, the input voltage of saturation amplifier 21 is a constant value (γ=MAX). Thus, only data directed to the destination node, that is, only phase information θ is inputted to saturation amplifier 21.

That is, when compared with general polar modulation circuit 10 shown in FIG. 15, since a phase bit (phase information θ) is directly inputted from modulation section 208, polar modulation circuit 20 constituting transmission RF section 209 according to the present embodiment shown in FIG. 16 eliminates the necessity for the polar coordinate conversion section. Furthermore, performing limiter transmission causes the input voltage of the saturation amplifier to become a constant value (and maximum value), and thereby eliminates the necessity for the terminal for the input voltage of saturation amplifier 21. That is, polar modulation circuit 20 according to the present embodiment shown in FIG. 16 is made up of only saturation amplifier 21 provided with only the terminal of the input signal to which phase information θ (data directed to destination node 300) is inputted.

Thus, by using a polar modulation circuit as the circuit of the radio transmission amplifier (transmission RF section 209) in relay node 200, it is possible to simplify the circuit configuration of the radio transmission amplifier compared to a case where a general polar modulation circuit is used. That is, the polar modulation circuit that performs modulation using amplitude information and phase information is suitably applicable to a transmission RF section of a relay node that relays a relay signal (data directed to the destination node) using only phase (phase information).

Thus, the present embodiment can further suppress power consumption required for relay processing in relay node 200. That is, relay node 200 can further reduce power consumption required for relay processing of data directed to destination node 300 and increase system capacity.

The embodiments of the present invention have been described so far.

A case has been described in the above embodiments where the source node uses 8PASK as a modulation scheme. However, the modulation scheme used by the source node is not limited to 8PASK, but the modulation scheme may be any modulation scheme as long as the modulation scheme is capable of expressing an amplitude bit whose value varies as the amplitude of a symbol changes and phase bits whose values vary as the phase of a symbol changes in a constellation.

Figure 17A:
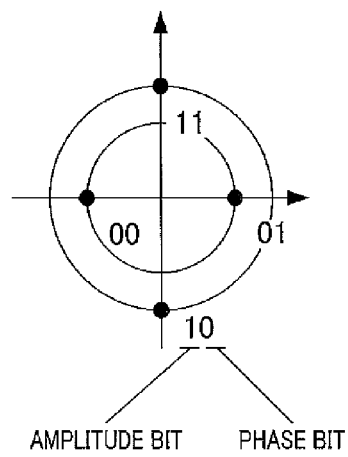
FIG. 17A is a diagram illustrating a constellation of a signal transmitted from a source node according to a variation of the present invention.
Figure 17B:
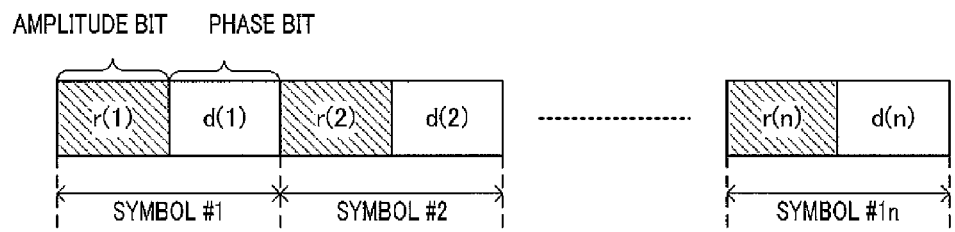
FIG. 17B is a diagram illustrating symbols transmitted from the source node according to the variation of the present invention.

For example, a case will be described where the source node uses 4QAM as the modulation scheme. As shown in FIG. 17A, in a constellation of 4QAM, the number of bits constituting one symbol is 2, the high-order one bit is an amplitude bit and the low-order one bit is a phase bit. That is, as shown is FIG. 17A, of the two bits constituting one symbol, when the high-order one bit (amplitude bit) is '1', the signal is modulated on the outside circle (ring) and when the high-order one bit (amplitude bit) is '0', the signal is modulated on the inside circle (ring). Furthermore, as shown in FIG. 17A, of the two bits constituting one symbol, when the high-order one bit (amplitude bit) is '1', a 90° offset of phase is added and when the high-order one bit (amplitude bit) is '0', a offset 90° of phase is not added. In this case, in the source node, of two bits constituting each symbol, data r(n) directed to the relay node is allocated to the high-order one bit (amplitude bit) and data d(n) directed to the destination node is allocated to the low-order one bit (phase bit) as shown in FIG. 17B. The relay node then extracts the high-order one bit (amplitude bit) out of the two bits constituting the symbol shown in FIG. 17A to obtain data directed to the relay node (r(n) shown in FIG. 17B) and extracts the low-order one bit (phase bit) to obtain data directed to the destination node (d(n) shown in FIG. 17B). The relay node then modulates data directed to the destination node corresponding to the low-order one bit (phase bit) using BPSK which is a modulation scheme using only phase, and relays the data. This makes it possible to reduce power consumption required for relay processing in the relay node as in the case of the above embodiment.

Figure 18A:
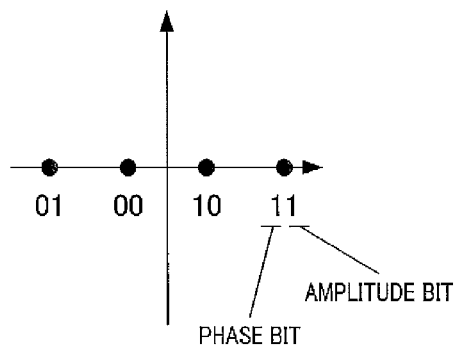
FIG. 18A is a diagram illustrating a constellation of a signal transmitted from the source node according to the variation of the present invention.
Figure 18B:
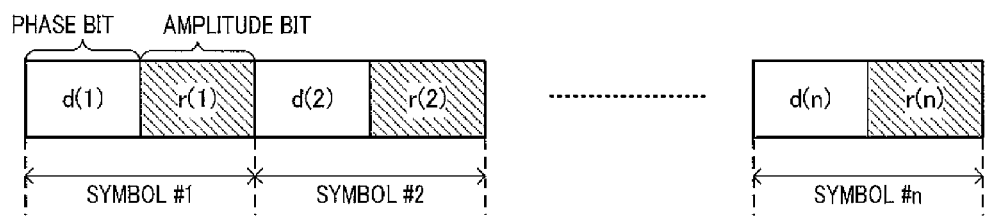
FIG. 18B is a diagram illustrating symbols transmitted from the source node according to the variation of the present invention.

Furthermore, a case will be described by way of example where the source node uses 4PASK as the modulation scheme. As shown in FIG. 18A, in the constellation of 4PASK, the number of bits constituting one symbol is 2, the low-order one bit is an amplitude bit and the high-order one bit is a phase bit. That is, as shown in FIG. 18A, of the two bits constituting one symbol, when the low-order one bit (amplitude bit) is '1', the signal is modulated by a symbol with greater amplitude ('11' or '01'). On the other hand, as shown in FIG. 18A, of the two bits constituting one symbol, when the low-order one bit (amplitude bit) is '0', the signal is modulated by a symbol with smaller amplitude ('10' or '00'). In this case, as shown in FIG. 18B, the source node allocates data r(n) directed to the relay node to the low-order one bit (amplitude bit) out of the two bits constituting each symbol, and allocates data d(n) directed to the destination node to the high-order one bit (phase bit). The relay node then extracts the low-order one bit (amplitude bit) out of the two bits constituting the symbol shown in FIG. 18A to obtain the data directed to the relay node (r(n) shown in FIG. 18B) and extracts the high-order one bit (phase bit) to obtain the data directed to the destination node (d(n) shown in FIG. 18B). The relay node then modulates the data directed to the destination node corresponding to the high-order one bit (phase bit) using BPSK which is the modulation scheme using only phase, and relays the modulated data. This makes it possible to reduce power consumption required for relay processing in the relay node as in the case of the above embodiment.

Figures 19A, 19B:
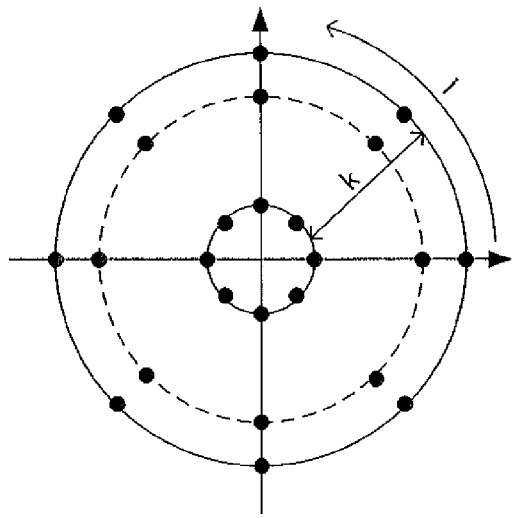
FIG. 19A is a diagram illustrating a constellation of a signal transmitted from the source node according to the variation of the present invention.
FIG. 19B is a diagram illustrating the number of amplitude bits and the number of phase bits in each modulation scheme according to the variation of the present invention.

Furthermore, as shown in FIG. 19A, for example, the source node may also use $2^{(k+1)}$ QAM ($2^{11}$ QAM in FIG. 19A) shown in FIG. 19B as the modulation scheme in which the number of amplitude bits is k (k=3 in FIG. 19A) and the number of phase bits is 1 (1=8 in FIG. 19A). That is, the source node allocates k bits of a plurality of bits ((k+1) bits) constituting one symbol to the data directed to the relay node, and allocates 1 bit to the data directed to the destination node. For example, as shown in FIG. 19B, in $16(=2^{(2+2)})$QAM, the source node allocates two bits of a plurality of bits (4 bits) constituting one symbol to the data directed to the relay node, and allocates two bits to the data directed to the destination node. The same applies to other modulation schemes shown in FIG. 19B.

A case has been described in the above embodiments where the relay node and the destination node feed back CQIs to the source node. Here, it is also possible to use as CQIs, the number of amplitude bits, the number of phase bits, a ratio between the number of amplitude bits and the number of phase bits, or a predetermined combination of the number of amplitude bits and the number of phase bits. For example, when the ratio between the number of amplitude bits and the number of phase bits is fed back instead of the aforementioned CQIs, the source node determines a modulation scheme or the like (that is, MCS information) based on the ratio between the number of amplitude bits and the number of phase bits.

Furthermore, a case has been described in the above embodiments by way of example where the present invention is configured by hardware, but the present invention may also be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-284345, filed on Dec. 15, 2009, including the specification, drawings and abstract is incorporated herein by reference in its entirety.

INDUSTRIAL APPLICABILITY

The present invention is applicable to a mobile communication system or the like.

REFERENCE SIGNS LIST 100, 400, 400a source node
200, 500 relay node
300 destination node
101, 201, 301 antenna
102, 202, 302 reception RF section
103 destination node CQI detection section
104 relay node CQI detection section
105 scheduler
106 MCS determining section
107, 108 coding section
109, 110 rate matching section
111 bit allocation section
112, 208 modulation section
113, 209 transmission RF section
203, 303 demodulation section
204 amplitude bit extraction section
205, 305 decoding section
206, 304 phase bit extraction section
207 relay processing section

The invention claimed is:

1. A radio relay apparatus that relays communication between a radio transmitting apparatus and a radio receiving apparatus, comprising:
   a demodulation section that demodulates a signal transmitted from the radio transmitting apparatus to obtain a plurality of bits constituting each symbol of the demodulated signal, the plurality of bits including an amplitude bit that varies when an amplitude of the symbol of the demodulated signal changes and a phase bit that varies when a phase of the symbol of the demodulated signal changes;
   a decoding section that decodes the amplitude bit among the plurality of bits, to obtain a signal directed only to the radio relay apparatus itself;
   a modulation section that modulates only the phase bit among the plurality of bits to generate a relay signal directed to the radio receiving apparatus; and
   a transmitting section that transmits a relay signal only including the phase bit modulated by the modulation section.

2. The radio relay apparatus according to claim 1, wherein the modulation section modulates the phase bit using a modulation scheme with a smaller amplitude variation than a modulation scheme of the signal transmitted from the radio transmitting apparatus.

3. The radio relay apparatus according to claim 1, wherein the modulation section modulates the phase bit in a modulation scheme using only phase, and further comprising a transmitting section that transmits the phase bit modulated by the modulation section through limiter operation.

4. The radio relay apparatus according to claim 1, wherein the decoding section decodes the amplitude bit and some of the phase bits, to obtain the signal directed to the radio relay apparatus, and
   the modulation section modulates bits other than the some bits of the phase bits to generate the relay signal directed to the radio receiving apparatus.

5. The radio relay apparatus according to claim 1, wherein the signal directed to the radio relay apparatus is a signal indicating information for controlling operation of relay processing in the radio relay apparatus.

6. The radio relay apparatus according to claim 1, further comprising a transmitting section that transmits the phase bit modulated by the modulation section using polar modulation.

7. A radio relay method in a radio relay apparatus that relays communication between a radio transmitting apparatus and a radio receiving apparatus, comprising:
   demodulating a signal transmitted from the radio transmitting apparatus, to obtain a plurality of bits constituting each symbol of the demodulated signal, the plurality of bits including an amplitude bit that varies when an amplitude of the symbol of the demodulated signal changes and a phase bit that varies when a phase of the symbol of the demodulated signal changes;
   decoding the amplitude bit among the plurality of bits to obtain a signal directed only to the radio relay apparatus itself;
   modulating only the phase bit among the plurality of bits to generate a relay signal directed to the radio receiving apparatus; and
   transmitting a relay signal only including the phase bit modulated by the modulation section.

* * * * *